United States Patent
O'Sullivan et al.

(10) Patent No.: US 9,324,043 B2
(45) Date of Patent: Apr. 26, 2016

(54) RESERVATION SYSTEM AND METHOD

(75) Inventors: Kevin D. O'Sullivan, Hove Sussex (GB); Renaud Irminger, Neuchatel (CH); Stephane Cheikh, Crozet (FR)

(73) Assignee: SITA N.V., Amsterdam (NL)

( * ) Notice: Subject to any disclaimer, the term of this patent is extended or adjusted under 35 U.S.C. 154(b) by 93 days.

(21) Appl. No.: 13/993,864

(22) PCT Filed: Dec. 9, 2011

(86) PCT No.: PCT/EP2011/072286
§ 371 (c)(1),
(2), (4) Date: Dec. 20, 2013

(87) PCT Pub. No.: WO2012/084549
PCT Pub. Date: Jun. 28, 2012

(65) Prior Publication Data
US 2014/0115057 A1     Apr. 24, 2014

Related U.S. Application Data

(60) Provisional application No. 61/425,507, filed on Dec. 21, 2010.

(51) Int. Cl.
*G06Q 10/02*     (2012.01)
*G06F 15/173*    (2006.01)
(Continued)

(52) U.S. Cl.
CPC ........ *G06Q 10/025* (2013.01); *G06F 15/17306* (2013.01); *G06Q 10/02* (2013.01); *G06Q 10/10* (2013.01); *G06Q 50/01* (2013.01); *G06Q 50/14* (2013.01)

(58) Field of Classification Search
CPC ................ G06Q 10/025; G06Q 15/17306
USPC ........ 709/204, 206, 207, 205; 705/5, 7.19, 80
See application file for complete search history.

(56) References Cited

U.S. PATENT DOCUMENTS

| 4,821,118 A | 4/1989 | Lafreniere |
| 5,270,921 A | 12/1993 | Hornick |

(Continued)

FOREIGN PATENT DOCUMENTS

| AU | 2002317935 A1 | 1/2003 |
| CN | 101436185 A | 5/2009 |

(Continued)

OTHER PUBLICATIONS

"Social Networks, Job Search Methods and Reservation Wages: Evidence for Germany"—Caliendo et al, IZA Sep. 2010 http://ftp.iza.org/dp5165.pdf.*

(Continued)

*Primary Examiner* — Randy Scott
(74) *Attorney, Agent, or Firm* — Morris, Manning & Martin, LLP; Daniel E. Sineway, Esq.; Bryan D. Stewart, Esq.

(57) ABSTRACT

A reservation system for travel, accommodation, venue ticketing and other purposes may be accessed on-line, for example via a social networking website. A user enters their social networking identification into the reservation system, which is stored for future use. When a subsequent user makes a reservation, they also enter their social networking ID and the system retrieves a list of associated parties from the social networking website, which may be a friends or contacts list, and searches for reservations made by any of those parties which have an overlapping criterion, such as date and destination. It then sends the subsequent user the social networking ID of the overlapping party. The overlap may be used to identify parties who will be at the same destination at the same time as the subsequent user, and/or are travelling on the same flight or journey. The list of associated parties may also be used to identify parties who are listing as living at the destination to which the subsequent user is travelling and those parties social networking IDs may be sent to the subsequent user. On check-in, the system may use the list of associated parties to notify the party checking-in that one of their friends or contacts has also check-in.

20 Claims, 4 Drawing Sheets

(51) Int. Cl.
   *G06Q 10/10*     (2012.01)
   *G06Q 50/00*     (2012.01)
   *G06Q 50/14*     (2012.01)

(56) References Cited

U.S. PATENT DOCUMENTS

| | | | |
|---|---|---|---|
| 5,918,209 A | 6/1999 | Campbell et al. |
| 6,108,636 A | 8/2000 | Yap et al. |
| 6,112,185 A | 8/2000 | Walker et al. |
| 6,158,658 A | 12/2000 | Barclay |
| 6,192,416 B1 | 2/2001 | Baxter |
| 6,367,016 B1 | 4/2002 | Lambert et al. |
| 6,473,704 B1 | 10/2002 | Ito et al. |
| 6,661,340 B1 | 12/2003 | Saylor et al. |
| 6,695,203 B2 | 2/2004 | Iki et al. |
| 6,757,712 B1 | 6/2004 | Bastian et al. |
| 6,760,778 B1 | 7/2004 | Nelson et al. |
| 6,869,023 B2 | 3/2005 | Hawes et al. |
| 7,035,828 B2 | 4/2006 | Ketonen et al. |
| 7,212,978 B2 | 5/2007 | Kowal et al. |
| 7,258,276 B2 | 8/2007 | Linton et al. |
| 7,327,262 B2 | 2/2008 | Motteram et al. |
| 7,421,319 B2 | 9/2008 | Stefani |
| 7,440,967 B2 | 10/2008 | Chidlovskii |
| 7,454,203 B2 | 11/2008 | Levitan |
| 7,483,696 B1 | 1/2009 | Mitchell |
| 7,486,960 B2 | 2/2009 | Brady et al. |
| 7,539,985 B2 | 5/2009 | Marvin |
| 7,571,206 B2 | 8/2009 | Koning et al. |
| 7,607,080 B2 | 10/2009 | Heuer et al. |
| 7,664,672 B1 | 2/2010 | Walker et al. |
| 7,668,873 B2 | 2/2010 | Davis et al. |
| 7,685,009 B2 | 3/2010 | Halavais et al. |
| 7,702,328 B2 | 4/2010 | Lemond et al. |
| 7,720,724 B2 | 5/2010 | Kurashige |
| 7,739,292 B2 | 6/2010 | Falk et al. |
| 7,786,899 B2 | 8/2010 | Baker et al. |
| 7,805,523 B2 | 9/2010 | Mitchell et al. |
| 7,870,101 B2 | 1/2011 | Hubbard et al. |
| 7,882,137 B2 | 2/2011 | Lepman |
| 7,907,067 B2 | 3/2011 | Baker et al. |
| 7,907,545 B2 | 3/2011 | Ric |
| 7,949,335 B2 | 5/2011 | Stefani et al. |
| 7,954,712 B2 | 6/2011 | Babcock et al. |
| 8,001,519 B2 | 8/2011 | Conallen et al. |
| 8,058,972 B2 | 11/2011 | Mohanty |
| 8,087,583 B2 | 1/2012 | Hawes |
| 8,090,603 B2 | 1/2012 | Payne et al. |
| 8,117,051 B2 | 2/2012 | Sauvage et al. |
| 8,160,759 B2 | 4/2012 | Baker et al. |
| 8,165,809 B1 | 4/2012 | Baker et al. |
| 8,170,535 B1 | 5/2012 | Lopes et al. |
| 8,195,151 B2 | 6/2012 | Cerra, II et al. |
| 8,214,144 B2 | 7/2012 | Baker et al. |
| 8,229,458 B2 | 7/2012 | Busch |
| 8,296,281 B2 | 10/2012 | Baker et al. |
| 8,332,136 B2 | 12/2012 | Baker et al. |
| 8,606,508 B2 | 12/2013 | Baker et al. |
| 8,671,009 B1 * | 3/2014 | Coley ................ G06Q 10/109 705/7.13 |
| 8,700,236 B1 | 4/2014 | Berman |
| 8,713,661 B2 | 4/2014 | Vysogorets et al. |
| 2002/0138184 A1 | 9/2002 | Kipersztok et al. |
| 2002/0138625 A1 | 9/2002 | Bruner et al. |
| 2002/0160773 A1 | 10/2002 | Gresham et al. |
| 2003/0034390 A1 | 2/2003 | Linton et al. |
| 2003/0048471 A1 | 3/2003 | Lundgren |
| 2003/0093187 A1 | 5/2003 | Walker |
| 2003/0111530 A1 * | 6/2003 | Iki .................... G07B 15/00 235/382 |
| 2003/0130769 A1 | 7/2003 | Farley et al. |
| 2003/0146871 A1 | 8/2003 | Karr et al. |
| 2003/0150922 A1 | 8/2003 | Hawes |
| 2003/0220116 A1 | 11/2003 | Sagefalk et al. |
| 2004/0030855 A1 | 2/2004 | Takeuchi et al. |
| 2004/0039617 A1 | 2/2004 | Maycotte et al. |
| 2004/0128193 A1 | 7/2004 | Brice et al. |
| 2004/0249836 A1 | 12/2004 | Reynders et al. |
| 2005/0004919 A1 | 1/2005 | Green et al. |
| 2005/0033666 A1 | 2/2005 | Kurashige |
| 2005/0071206 A1 | 3/2005 | Berge |
| 2005/0228702 A1 | 10/2005 | Fairbanks et al. |
| 2005/0258247 A1 | 11/2005 | Hawes |
| 2006/0004590 A1 | 1/2006 | Khoo |
| 2006/0004781 A1 | 1/2006 | Burgel et al. |
| 2006/0053056 A1 | 3/2006 | Alspach-Goss et al. |
| 2006/0075934 A1 | 4/2006 | Ram |
| 2006/0085451 A1 | 4/2006 | Pal et al. |
| 2006/0095434 A1 | 5/2006 | McCullough et al. |
| 2006/0097046 A1 | 5/2006 | Fassio et al. |
| 2006/0173680 A1 | 8/2006 | Verhasselt et al. |
| 2006/0206246 A1 | 9/2006 | Walker |
| 2006/0234700 A1 | 10/2006 | Funderburk et al. |
| 2006/0238384 A1 | 10/2006 | Hess et al. |
| 2006/0259456 A1 | 11/2006 | Falk et al. |
| 2006/0277231 A1 | 12/2006 | Kral et al. |
| 2006/0288021 A1 | 12/2006 | Kojima |
| 2007/0055416 A1 | 3/2007 | Allen |
| 2007/0072590 A1 | 3/2007 | Levitan |
| 2007/0111725 A1 | 5/2007 | Kauffman et al. |
| 2007/0127460 A1 | 6/2007 | Wilber et al. |
| 2007/0149216 A1 | 6/2007 | Misikangas |
| 2007/0157078 A1 | 7/2007 | Anderson |
| 2007/0198314 A1 | 8/2007 | Andrew et al. |
| 2007/0203796 A1 | 8/2007 | Riggs |
| 2007/0222595 A1 | 9/2007 | Motteram et al. |
| 2007/0233617 A1 | 10/2007 | Gillespie |
| 2007/0244766 A1 | 10/2007 | Goel |
| 2007/0250356 A1 | 10/2007 | Douglas |
| 2007/0265881 A1 | 11/2007 | El Elman et al. |
| 2007/0273514 A1 | 11/2007 | Winand et al. |
| 2008/0010005 A1 | 1/2008 | Small et al. |
| 2008/0015926 A1 | 1/2008 | De Marcken |
| 2008/0027765 A1 | 1/2008 | Gunn et al. |
| 2008/0027955 A1 | 1/2008 | May et al. |
| 2008/0046298 A1 | 2/2008 | Ben-Yehuda et al. |
| 2008/0065480 A1 | 3/2008 | Baker et al. |
| 2008/0070517 A1 | 3/2008 | Brady et al. |
| 2008/0091445 A1 * | 4/2008 | Mihic ............................ 705/1 |
| 2008/0099552 A1 | 5/2008 | Grillion |
| 2008/0140226 A1 | 6/2008 | Ganev |
| 2008/0140434 A1 | 6/2008 | O'Brien |
| 2008/0224823 A1 | 9/2008 | Lawson et al. |
| 2008/0229228 A1 | 9/2008 | Cohen |
| 2009/0010200 A1 | 1/2009 | Lauer et al. |
| 2009/0015398 A1 | 1/2009 | Bhogal et al. |
| 2009/0030781 A1 | 1/2009 | Mehta et al. |
| 2009/0033491 A1 | 2/2009 | Saunders |
| 2009/0063219 A1 | 3/2009 | Raufaste et al. |
| 2009/0070841 A1 | 3/2009 | Buga et al. |
| 2009/0081947 A1 | 3/2009 | Margis |
| 2009/0112473 A1 | 4/2009 | Lu et al. |
| 2009/0164500 A1 | 6/2009 | Mathur et al. |
| 2009/0182590 A1 | 7/2009 | Ashby et al. |
| 2009/0187494 A1 | 7/2009 | Heath |
| 2009/0196201 A1 | 8/2009 | Ric |
| 2009/0248457 A1 | 10/2009 | Munter et al. |
| 2009/0256675 A1 | 10/2009 | Kerr |
| 2009/0259549 A1 | 10/2009 | Winand et al. |
| 2009/0287513 A1 | 11/2009 | Anderson et al. |
| 2009/0288123 A1 | 11/2009 | Havlovick et al. |
| 2009/0307020 A1 | 12/2009 | Viale et al. |
| 2009/0310530 A1 | 12/2009 | Cerra, II et al. |
| 2009/0313601 A1 | 12/2009 | Baird et al. |
| 2010/0027461 A1 | 2/2010 | Bothorel |
| 2010/0030591 A1 | 2/2010 | Viard et al. |
| 2010/0065632 A1 | 3/2010 | Babcock et al. |
| 2010/0076795 A1 | 3/2010 | Steir et al. |
| 2010/0076826 A1 | 3/2010 | Bayne |
| 2010/0078475 A1 | 4/2010 | Lin et al. |
| 2010/0102934 A1 | 4/2010 | Guichard |
| 2010/0159871 A1 | 6/2010 | Tester |
| 2010/0190510 A1 | 7/2010 | Maranhas et al. |
| 2010/0191782 A1 | 7/2010 | Brzozowski |

(56) References Cited

U.S. PATENT DOCUMENTS

| | | |
|---|---|---|
| 2010/0198628 A1 | 8/2010 | Rayner |
| 2010/0205448 A1 | 8/2010 | Tarhan et al. |
| 2010/0205605 A1 | 8/2010 | Johnson et al. |
| 2010/0245034 A1 | 9/2010 | D'Oliveiro et al. |
| 2010/0268656 A1 | 10/2010 | Teicher |
| 2010/0332358 A1 | 12/2010 | Owens |
| 2011/0004832 A1 | 1/2011 | Canal et al. |
| 2011/0018769 A1 | 1/2011 | Misikangas et al. |
| 2011/0028160 A1 | 2/2011 | Roeding et al. |
| 2011/0119183 A1 | 5/2011 | Berman |
| 2011/0227737 A1 | 9/2011 | Kamins |
| 2012/0035965 A1 | 2/2012 | Maguire et al. |
| 2012/0042263 A1* | 2/2012 | Rapaport ............... 715/753 |
| 2012/0042371 A1 | 2/2012 | Gur et al. |
| 2012/0075168 A1 | 3/2012 | Osterhout et al. |
| 2012/0101885 A1 | 4/2012 | Lee et al. |
| 2012/0123844 A1 | 5/2012 | Fano et al. |
| 2012/0129546 A1 | 5/2012 | Yang et al. |
| 2012/0200390 A1 | 8/2012 | Saravanan |
| 2012/0203578 A1 | 8/2012 | Baggett et al. |
| 2012/0284108 A1 | 11/2012 | Fontana et al. |
| 2013/0069985 A1 | 3/2013 | Wong et al. |
| 2013/0141313 A1 | 6/2013 | Zhou et al. |
| 2013/0211864 A1 | 8/2013 | Sanderson et al. |
| 2013/0234849 A1 | 9/2013 | Gupta et al. |
| 2013/0267255 A1 | 10/2013 | Liu et al. |
| 2013/0295966 A1 | 11/2013 | Dingler et al. |
| 2013/0297103 A1 | 11/2013 | Baker et al. |
| 2013/0314257 A1 | 11/2013 | Macrae et al. |
| 2013/0325526 A1 | 12/2013 | Tyler |
| 2014/0006070 A1 | 1/2014 | Stamler |
| 2014/0012640 A1 | 1/2014 | Roberts et al. |
| 2014/0039717 A1 | 2/2014 | Henkel |
| 2014/0052482 A1 | 2/2014 | Le Marier et al. |
| 2014/0067244 A1 | 3/2014 | Baker et al. |
| 2014/0075506 A1 | 3/2014 | Davis et al. |
| 2014/0123315 A1 | 5/2014 | Baker et al. |
| 2014/0188311 A1 | 7/2014 | Masson |

FOREIGN PATENT DOCUMENTS

| | | |
|---|---|---|
| DE | 10357831 A1 | 7/2005 |
| EP | 1318463 A1 | 6/2003 |
| EP | 1454306 A2 | 9/2004 |
| EP | 1 610 094 A1 | 12/2005 |
| EP | 1679624 A2 | 7/2006 |
| EP | 1874001 B1 | 1/2008 |
| EP | 2088543 A1 | 8/2009 |
| EP | 2088569 A1 | 8/2009 |
| EP | 2222053 A1 | 8/2010 |
| EP | 2290600 A2 | 3/2011 |
| EP | 2362354 A2 | 8/2011 |
| EP | 2 390 845 A1 | 11/2011 |
| EP | 2474931 A1 | 7/2012 |
| GB | 2366945 A | 3/2002 |
| GB | 2408131 B | 3/2006 |
| GB | 2418511 A | 3/2006 |
| GB | 2469026 A | 10/2010 |
| GB | 2470897 A | 12/2010 |
| GB | 2501144 A | 10/2013 |
| JP | 2005135199 A | 5/2005 |
| JP | 2006053724 A | 2/2006 |
| JP | 2008117340 A | 5/2008 |
| JP | 2008171181 A | 7/2008 |
| JP | 2009093603 A | 4/2009 |
| WO | 0073954 A2 | 12/2000 |
| WO | 0135269 A2 | 5/2001 |
| WO | 0135289 A1 | 5/2001 |
| WO | 0157323 A1 | 8/2001 |
| WO | 0215582 A1 | 2/2002 |
| WO | 03005237 A1 | 1/2003 |
| WO | 2004045106 A1 | 3/2004 |
| WO | 2006010774 A1 | 2/2006 |
| WO | 2007113844 A1 | 10/2007 |
| WO | 2008/055181 A2 | 5/2008 |
| WO | 2009002139 A1 | 12/2008 |
| WO | 2009021068 A1 | 2/2009 |
| WO | 2009058505 A1 | 5/2009 |
| WO | 2009091553 A1 | 7/2009 |
| WO | 2011057323 A1 | 5/2011 |
| WO | 2011208233 A1 | 7/2011 |
| WO | 2012106075 A1 | 8/2012 |
| WO | 2012105829 A3 | 9/2012 |
| WO | 2013079512 A1 | 6/2013 |

OTHER PUBLICATIONS

Sam Schechner, "Airlines Entertain Tablet Ideas—Rather Than Wiring Planes for In-Flight Movies, Some Hand Out iPads", http://online.wsj.com/articles/SB10000872396390443916104578020601759253578, Sep. 2012.

Mary Kirby, "Personal Services—In-flight connectivity poised to change the passenger experience for ever", http://www.flightglobal.com/news/articles/personal-services-in-flight-connectivity-poised-to-change-the-passenger-experience-for-332765/, Sep. 2009.

Lawrence Kitson, "The Future of In-flight: Part Two—The Concierge Concept", http://ustwo.com/blog/the-future-of-in-flight-part-two-the-concierge-concept/, Apr. 2012.

Examination Report of Malaysian Application No. 2013001405, received from the Intellectual Property Corporation of Malaysia on Oct. 28, 2014.

International Civil Aviation Organization, Machine Readable Travel Documents, Part 1, Machine Readable Passports—vol. 1, Specifications for Electronically Enabled Passports with Biometric Identification Capability, Sixth Edition, 99 pages, 2006.

International Civil Aviation Organization, Machine Readable Travel Documents, Part 1, Machine Readable Passports—vol. 2, Passports with Machine Readable Data Stored in Optical Character Recognition Format, Sixth Edition, 131 pages, 2006.

International Civil Aviation Organization, Machine Readable Travel Documents, Part 3, Machine Readable Official Travel Documents—vol. 1, MRtds with Machine Readable Data Stored in Optical Character Recognition Text International Civil Aviation Organization, Third Edition, 122 pages, 2008.

International Civil Aviation Organization, Machine Readable Travel Documents, Part 3, Machine Readable Official Travel Documents—vol. 2, Specifications for Electronically Enabled MRtds with Biometric Identification Capability, Third Edition, 149 pages, 2008.

Dunkel, Jürgen, et al., Model-Driven Architecture for Mobile Applications, pp. 464-477, 2007, Hannover University of Applied Sciences and Arts, Department of Computer Sciences, Hannover Germany.

Glushko, Robert J., et al., Bridging the "Front Stage" and "Back Stage" in Service System Design, pp. 1-10, 2008, University of California, Berkely, School of Information, Proceedings of the 41st Hawaii International Conference on System Sciences, Institute of Electrical and Electronics Engineers (IEEE).

Johnston, Michael, et al., Multimodal Applications from Mobile to Kiosk, 4 pages, AT&T Research, Florham Park, New Jersey, USA.

Kindervater, Gerard, Revenue Management in the Airline Passenger Industry, 24 pages, AirFrance KLM.

Li, Quanzhong, et al., XVM: A Bridge Between XML Data and Its Behavior, 9 pages, May 17-22, 2004, 13th International Conference on World Wide Web, New York, New York, USA.

Madria, Sanjay, An XML Schema Integration and Query Mechanism System, pp. 266-303, 2007, Elsevier B.V., Science Direct, Data & Knowledge Engineering 65 (2008).

McGuire, Kelly A., et al., The Future of Revenue Management, 5 pages, 2009, SAS Global Forum 2009, SAS Institute, Inc.

Smith, Barry C., et al., Yield Management at American Airlines, pp. 8-31, 1992, American Airlines Decision Technologies, Dallas/Fort Worth Airport, Texas, USA.

Xu, Liping, et al., A Model of Capacity Control with Overbooking for a Two-leg Airlines Network, 5 pages, 2008, Institute of Electrical and Electronics Engineers (IEEE).

Marmesse, M., et al., Location-aware Information Delivery with comMotion, MIT Media Laboratory, Cambridge, MA, HUC 2000 Proceedings, pp. 157-171, Springer-Verlag.

(56) References Cited

OTHER PUBLICATIONS

Chen, G., et al., A Survey of Context-Aware Mobile Computing Research, Dartmouth College, Department of Computer Science, Hanover, New Hampshire.
Munoz, M., et al., Context-Aware Mobile Communication in Hospitals, IEEE Computer Society, Sep. 2003.
Schwinger, W., et al., Context-Aware in Mobile Tourism Guides—A Comprehensive Survey, Austrian Federal Ministry for Education, Science, and Culture, and the European Social Fund, 2002.
Kinneging, T., Machine Readable Travel Documents—Technical Report: PKI for Machine Readable Travel Documents Offering ICC Read-Only Access, PKI Task Force, International Civil Aviation Organization, Version 1.1, Oct. 1, 2004.
International Search Report and the Written Opinion of the International Search Authority (EPO) for PCT/EP2013/057497 dated Jun. 27, 2013.
Susan Stellin, "Automation Is Considered for Checking IDs in Airports", Business Day, *The New York Times*, Mar. 19, 2012, 3 pages, retrieved Sep. 4, 2014, http://www.nytimes.com/2012/03/20/business/tsa-is-considering-automating-id-checks.html.
Robert Longley, "TSA's New ID, Boarding Pass Scanning System Draws Criticism", US Government, About.com, Aug. 2, 2012, 2 pages, retrieved online on Jul. 30, 2014, http://usgovinfo.about.com/od/defenseandsecurity/a/Tsa-Boarding-Pass-Scanning-System-Draws-Criticsm.htm#&newsissues&newsissues.
Search Report of Application No. GB 1403967.1, received from the UK Intellectual Property Office on Aug. 4, 2014.
Examination Opinion of Application No. GB 1403967.1, received from the UK Intellectual Property Office on Aug. 5, 2014.
Search Report of Singapore Application No. 201306353-2, received from the Danish Patent and Trademark Office on Jun. 16, 2014.
Written Opinion of Singapore Application No. 201306353-2, received from the Danish Patent and Trademark Office on Jun. 16, 2014.
International Search Report for PCT/EP2011/072286, dated Mar. 19, 2012.
AIRCOM Server Administrator Guide, SITA Airline Telecommunications and Information Services, Feb. 19, 2013, pp. 1-280.
AIRCOM Server User Guide, SITA Airline Telecommunications and Information Services, Jan. 24, 2013, pp. 1-153.
Examination Report received in Malaysian Application No. PI 2013000936.
International Search Report and the Written Opinion mailed in International Application No. PCT/EP2013/052590 filed Aug. 2, 2013.
International Search Report and Written Opinion mailed in International Application No. PCT/EP2011/070551 filed Nov. 21, 2011.
International Search Report and Written Opinion mailed in International Application No. PCT/EP2014/062464 filed Jun. 13, 2014.
International Search Report and Written Opinion mailed in International Application No. PCT/EP2015/053319 filed Feb. 17, 2015.
Russian Search Report for 2013133853/08(050668) mailed Feb. 20, 2015.
Search Report and Examination Opinion mailed in International Application No. GB1421313.6.
Search Report and Written Opinion of Singapore Application No. 201301980-7, dated Sep. 3, 2013.
Written Opinion mailed in Singapore Application No. 201301978-1, dated Oct. 15, 2013.
International Search Report and Written Opinion mailed in Singapore Application No. 11201404575U.
Glaser-Opitz, et al., Evaluation of CPDLC and Voice Communication During Approach Phase, Digital Avionics Conference, Sep. 13-17, 2015.
Hull, et al., Technology-Enabled Airborne Spacing and Merging, Digital Avionics Systems Conference, 2004.
International Examination Report mailed in Australian Application No. 2011347893 dated Sep. 11, 2015.
International Search Report and Written Opinion mailed in International Application PCT/EP2015/068682 dated Oct. 29, 2015.
Kenney, et al., Secure ATC Surveillance for Military Applications, Military Communications Conference, 2008.
Lee, et al., Effectiveness of the Ground-Based Transceiver (GBT) Parrot System for Monitoring GPS Integrity for Alaska ATC "Radar-Like Services" Using ADS-B, Digital Avionics Systems Conference, 2004.
Search Report and Written Opinion mailed Apr. 2, 2014 in GB Application No. 1317659.9.
Belobaba, Fundamentals of Pricing and Revenue Management, The Global Airline Industry, 2009.

\* cited by examiner

RESERVATION SYSTEM AND METHOD

CROSS-REFERENCE TO RELATED APPLICATIONS

This application is a U.S. national phase application and claims the benefit of and priority under 35 U.S.C. §§119, 120 to U.S. Provisional Patent Application Ser. No. 61/425,507, filed Dec. 21, 2010, entitled "Reservation System and Method", by Kevin O'Sullivan et al., and to International Patent Application No. PCT/EP2011/072286, filed Dec. 9, 2011, entitled "Reservation System and Method", by Kevin O'Sullivan et al., the disclosures of which are incorporated herein by reference as if set forth herein in their entireties.

FIELD OF THE INVENTION

This invention relates to on-line reservation systems and methods. It is particularly, but not exclusively, concerned with ticketing systems and methods for travel and events and also with reservation systems for hotels, venues and the like.

BACKGROUND TO THE INVENTION

In recent years, social networking has become one of the biggest activities on the Internet. The most used social networking sites include Facebook (www.facebook.com) for personal networking and LinkedIn (www.linkedin.com) for professional networking. As these social media systems have developed, they have begun to integrate with service providers enabling users of social media sites to access third party goods and services from the social media sites.

Within the travel industry there has been some integration of travel related systems into social networking sites. One example in the airline industry is Delta Airlines which has a booking engine hosted in Facebook which can be accessed at http://www.facebook.com/delta?v=app 119581404755652. However, this booking engine does not integrate with the Facebook functionality and merely provides a window through which a user of the social networking site can access the booking system. EasyJet provides a similar link at http://www.facebook.com/easyjet?v=app 10442206389. This is merely a link that redirects to their web site www.easyjet.com.

Satisfly Limited (www.satisfly.orq) had proposed a service which aims to find compatible seat neighbours on airline flights.

Booking aggregation web sites such as Tripit (www.tripit.com) and Doppler (www.dopplr.com) enable users to publish details of travel plans to contacts on social networking sites once those plans have been made. A user of these systems would make their travel reservations independently of these sites but then publish details to their contacts once the reservations have been made.

We have appreciated that the amount of interaction between these existing systems and social networking sites is very limited and that the existing interaction does not utilise many of the attractive features of social networking web sites. The present invention aims to address that problem and to improve the interaction between reservation systems and social networking platforms such as web sites.

According to a first aspect of the invention there is provided a computerised on-line reservation method, comprising the steps of: receiving a reservation enquiry at a computerised booking system from a user; receiving the user's identification on a social networking platform at the computerised booking system; storing the social networking identification of the user in a database associated with the computerised booking system; in response to a subsequent user submitting a reservation enquiry; retrieving a list of social networking identifications (SNIDs) for that user from the social networking platform, the list comprising a group of one or more other parties registered on the social networking platform with whom the subsequent user is associated; searching, at the computerised booking system, for third party reservations having at least one overlapping reservation criterion and an associated SNID from the subsequent user's list; and displaying to the subsequent user the SNID of a third party identified by the search together with information regarding the reservation.

This aspect of the invention also provides a computerised on-line reservation system, comprising: a computerised booking system for receiving a reservation enquiry from a user, the computerised booking system being configured to receive the user's identification on a social networking platform at the computerised booking system; a store for storing the social networking identification of the user in a database associated with the computerised booking system; the computerised booking system further being configured to, in response to receiving a reservation enquiry from a subsequent user; retrieve a list of social networking identifications (SNIDs) for that user from the social networking platform, the list comprising a group of one or more other parties registered on the social networking platform with whom the subsequent user is associated; the system further comprising a search engine for searching, at the computerised booking system, for third party reservations having at least one overlapping reservation criterion and an associated SNID from the subsequent user's list; and the computerised booking system being configured to send to the subsequent user for display, the SNID of a third party identified by the search together with information regarding the reservation.

Embodiments of the invention have the advantage that functionality of the social networking platform can be accessed and taken advantage of to enhance the reservation process by bringing to the attention of the reserving party reservations made by friends or contacts with whom they are associated on the social networking platform and which have at least one overlapping reservation criteria.

A preferred embodiment of the invention comprises, on sending the subsequent enquiry, sending a request to the social networking platform to retrieve the city of residence of each party in the subsequent user's list of associated parties; comparing the residences of the list of associated parties with the chosen destination of the subsequent user; and displaying in the subsequent user's browser, an identification of any party from the list recorded by the social networking platform as resident in the subsequent user's destination city. This embodiment has the advantage of drawing the subsequent user's attention to friends or contacts with whom he is associated who are listed on the social networking platform as living in the destination to which the subsequent user is intending to travel, thus enabling the subsequent user to contact them before travelling.

Preferably, the overlapping criterion comprises destination and date. In one preferred embodiment, the reservation system is a travel reservation system and the overlapping criterion comprises the instance of travel being reserved by the subsequent user. Preferably the instance of travel is one of a flight, rail journey, road journey or water journey. This embodiment has the advantage that the subsequent user can see which of their associated friends or contacts are booked onto a flight, or other form of travel, that they are considering booking.

Preferably, the method further comprises, on receipt of a check-in request message received at the booking engine from the user's browser, retrieving the identifications of the user's friends or contacts lists on the social networking platform and comparing the identifications of the friends or contacts lists with other passengers checked in or scheduled to check-in to the same journey as said user; and on finding a matching social networking ID, causing the user's browser to display the matching ID. This embodiment of the invention has the advantage of drawing the user's attention to associated friends or contacts at the time of check-in In one preferred embodiment, the reservation is a seat reservation and the third party's social networking ID is displayed together with the seat to which that ID has been allocated where the third party has checked in. In another preferred embodiment the reservation is a room accommodation and the third party's social networking ID is displayed together with the room to which that ID has been allocated if the third party has checked-in. These embodiments have the advantage of drawing the attention to the specific location of the third party if they have checked-in already.

In one preferred embodiment, the user's social networking ID is received from the user as part of the reservation request. Alternatively, the ID may be retrieved the database associated with the booking system or from an associated booking system. This has the advantage of making the system easy to operate and requires a user to enter their social networking ID once after which it is available over a plurality of different platforms.

A second aspect of the invention provides a computerised on-line check-in method for check-in into a previously made reservation, comprising the steps of: receiving a check-in request at a computerised booking system from a user computer via a browser; receiving the user's identification on a social networking platform at the computerised booking system; retrieving a list of social networking identifications (SNIDs) for that user from the social networking platform, the list comprising a group of one or more other parties registered on the social networking platform with whom the subsequent user is associated; searching, at the computerised booking system, for third party reservations having at least one overlapping criterion and an associated SNID from the subsequent user's list; and causing the user's browser to display the SNID of a third party identified by the search together with information regarding the reservation.

This aspect of the invention also provides a computerised on-line check-in system for check-in to a previously made reservation, comprising a computerised booking system configured to: receive a check-in request from a user; receive the user's identification on a social networking platform; retrieve a list of social networking identifications (SNIDs) for that user from the social networking platform, the list comprising a group of one or more other parties registered on the social networking platform with whom the subsequent user is associated; the system further comprising a search engine for searching for third party reservations having at least one overlapping criterion and an associated SNID from the subsequent user's list; the booking system further being configured to send to the user for display, the SNID of a third party identified by the search together with information regarding the reservation.

In one preferred embodiment the reservation is a reservation for travel and the user's browser is caused to display the associated SNIDs of parties making the same journey. The booking system may determine whether a third party identified by the search has check-in and, if it has, displays the seat number of the third party in the user's browser.

In another preferred embodiment the reservation is a reservation for accommodation and the user's browser is caused to display the associated SNIDs or parties having booked the accommodation for an overlapping period. The booking system may determine whether a third party identified by the search has checked-in, and if it has, display the room number of the third party in the user's browser.

In one embodiment, the social network platform is a web browser.

Embodiments of the invention will now be described, by way of example only, with reference to the accompanying drawings in which:

FIG. 3 is a logical view of an embodiment of the invention enabling a user to check-in.

The following embodiments will be described in the context of flight reservation and check-in. However, it is to be appreciated that the invention is not limited to flight check-in and reservation and applies to any other form of transportation, including but not limited to trains, ships and cars. It is also applicable to other, non-travel related reservation systems such as events, venues, concerts, theatre, stadia, sports grounds and hotel and motel accommodation. The invention is not limited to systems and methods which handle reservations which require check-in after the reservation has been made. The air travel embodiment is given as an example only and is not to be construed as limiting.

In this specification, the term booking refers to a confirmed order, whereas the term reservation covers not only confirmed orders (bookings) but also tentative or putative orders that have not yet been confirmed.

The following example uses Facebook (www.facebook.com) as an example of a social networking platform, in this case a web site. However, it is also to be understood that the invention is not limited to any particular social networking platform or site and may be used with any suitable site including, but not limited to, Facebook (www.facebook.com); Bebo (www.bebo.com); Linkedin (www.linkedin.com); Twitter (www.twitter.com) and Plaxo (www.plaxo.com). It may also be used with social networks which are not hosted on websites, for example enterprise solutions within large companies. The only requirement of such a site is that users have a list of Friends or contacts, being a group of other users of the website or other platform who have consented to be associated with the user.

Figure 1:
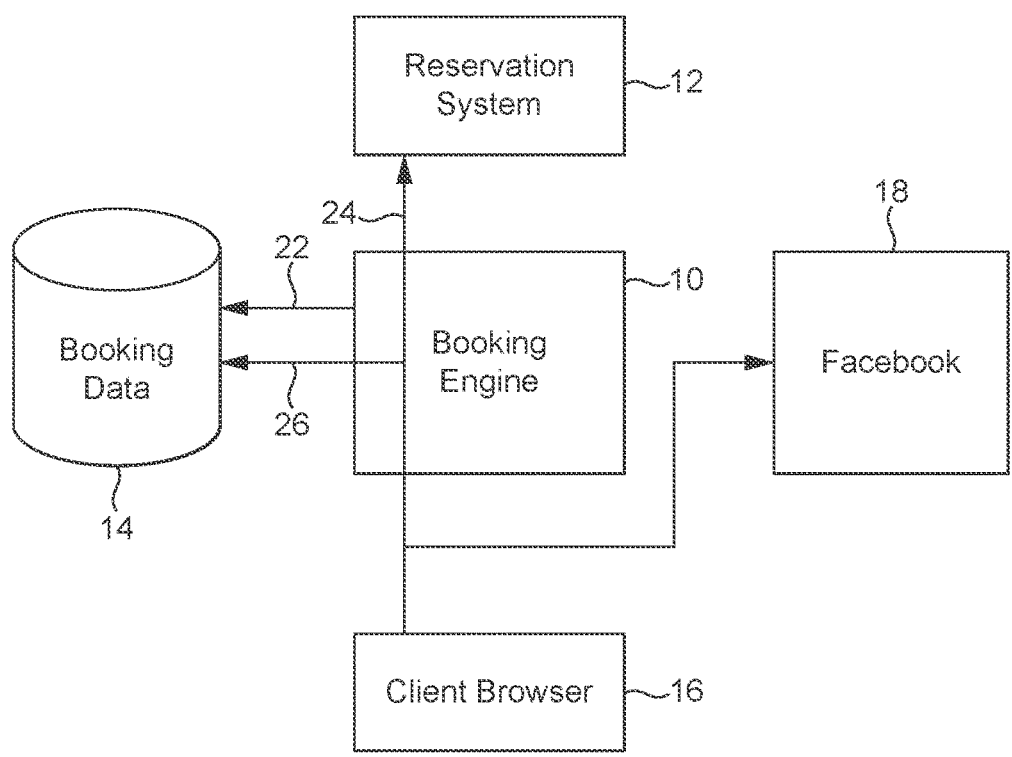
FIG. 1 is a logical view of an embodiment of the invention enabling a reservation to be made.

FIG. 1 shows a booking engine 10 which is a software tool for handling the booking of flights. The booking engine is resident on one or more servers and communicates with a reservation system 12 and a database 14 of booking or reservation data 14. The reservation system may also comprise a dedicated software application running on one or more servers. Users can communicate with the booking engine via conventional communication links through an Internet browser 16 on their computer which enables them also to communicate with a social networking web site 18.

Social networking sites operate by registering users and assigning each registered user an identification. In embodiments of the present invention, the social networking identification (ID) of a user making a booking is stored in the database 14 together with other particulars of the booking. These particulars include conventional reservation details such as city, date, class of travel, airline etc and will vary depending on the type of reservation made.

The social networking identification data may be captured from multiple sources including, but not limited to, a call centre booking engine, a mobile booking engine, and an Internet booking engine. When a customer interfaces with a booking system, either via the social networking web site of otherwise, they may be asked to input their social networking identification for future use. The booking system may be a single system into which reservations and bookings may be made from a number of different sources such as on-line, including via a social networking site, via a call centre booking engine and through other interfaces with the system. The social networking identification data may be stored in separate tables which may be accessed from any part of the system.

In FIG. 1, the step of storing the ID together with other booking data is shown at arrow 22 as an operation performed on the database by the booking engine 10.

At some point after a booking has been made, a different user will access the booking engine via a social networking platform, in this example a web site. Rather than booking a specific flight, a user will typically make a search for flight availability to a particular destination on a particular day or around a particular date. The booking engine performs, in a known manner, an availability search for the airline against the airline reservation system 12, for example, a standard or other priced search, and returns data to the client browser 16 showing flight options and prices. This is a conventional step made as part of any online booking system. This step is shown by arrow 24 in FIG. 1. In parallel, the client browser 16 initiates an asynchronous enquiry to the booking engine sending a list of the users friends or contacts on the social networking site 18 together with the travel search criteria. An asynchronous enquiry is a known method of retrieving information from a server in the background without interfering with the display and behaviour of the existing page. The friends or contacts list is common to all social networking sites and will comprise a list of IDs in appropriate format for that social networking site. The list comprises the IDs of other users of the system who have consented to be associated with the user. As a result of that association the see information about the user posted to the website. The terminology used varies from site to site. Friends is used by Facebook and other personal networking sites, whereas Contacts is used by professional sites such as Linkedin.

In this example the reservation and check-in are described as made via a browser, in this case a web browser. Although this is presently preferred, other options are possible, for example via a mobile phone or kiosk which may not be browser based but still able to access the social network site. In other embodiments the social network may resident within an organisation and accessed via an API.

The booking engine 10 then searches the database 14 for other bookings that have already been stored and seeks to retrieve bookings where there is an overlap in the stored destination and dates and the social networking ID of these overlapping bookings is on the list of IDs communicated from the user via their browser. This overlap may be either be to identify IDs of friends or contacts on the same flights as have been returned by the search, or who will be in the same destination for all or a part of the duration of the trip being booked. Alternatively, both types of overlap may be identified.

The social networking ID of the owner of the overlapping booking is then communicated to the user in their client browser together with other flight details. This process is illustrated by arrow 26 in FIG. 1.

As these overlaps relate to users of the social networking site who are also user of the airline reservation system, their social networking Ids will already be stored in the reservation system which does not, therefore, need to communicate with the social networking site to perform the overlap search.

Optionally, in parallel, the client browser initiates a further asynchronous enquiry to the social networking system 18 to retrieve the cities in which the friends on the user's friends list are recorded as living. If there are any friends who live in the destination city of the user's booking, the information is displayed alongside the flight options and prices. As this data includes friends or contacts who are not travelling, the search has to be made outside the reservation system.

Figure 2:
FIG. 2 is a screen shot presented to a user during the booking process.

FIG. 2 shows a flight search page displayed in the user's browser following a booking enquiry made following the process described above. The user has selected a Book Flight tab 30 and details of possible outbound flights are displayed. In this case the departure is from Miami to Atlanta on 9 Oct. 2010. Illustrated at 32 are details of friends who have also flown to the same destination. These are the social networking IDs of friends returned by the search for overlapping destinations and dates. In this example, a single friend is identified by their user name (Thomas Puebbloclaro) together with an icon. The identification will differ depending on the social networking site being used. The ID also includes a link labelled "share with friends" that enables the user to share their travel plans with their list of friends on the social networking site.

Beneath the ID of friends with an overlapping flight and destination is shown, at 34, a list of friends that the social networking system has indicated to be living in the destination city selected. In this case the name and icon of Stephane Cheikh is listed. This information may also be shared with other listed friends on the social networking web site.

Thus, through storage of social networking identifiers, the system can determine which of a user's listed friends or contacts on that social networking site has an overlapping booking in terms of destination and dates. This may be flight specific or identify that they will be in the same place at the same time. Additionally, by interaction with the social networking website, the system can notify the user of any of their friends listed as friends on the social networking site that are recorded by the social networking site as being resident in their chosen destination city.

It will be appreciated that the notification of friends in the destination city is not essential and may be omitted. Alternatively, the notification of friends in the destination city could be used without the notification of friends having overlapping flights and destinations.

Another option is for the system to return to the user the IDs of friends or contacts who have travelled to the destination, so that the travelling party may contact them with a view to discussing their journey.

Figure 3:
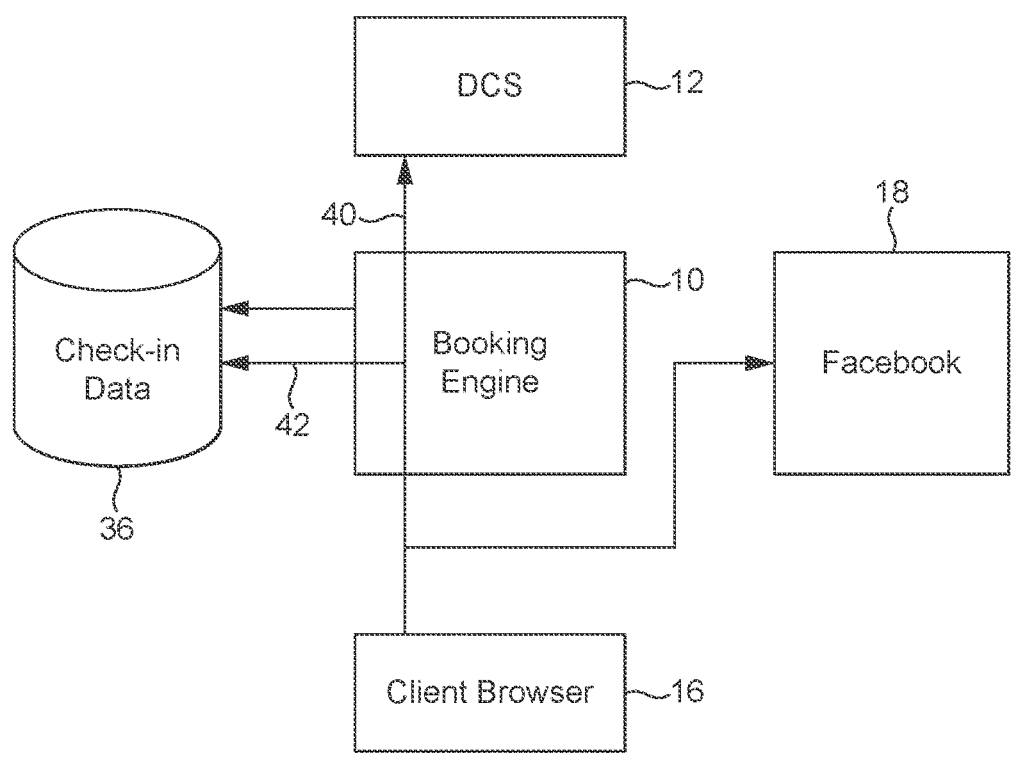
Figure 4:
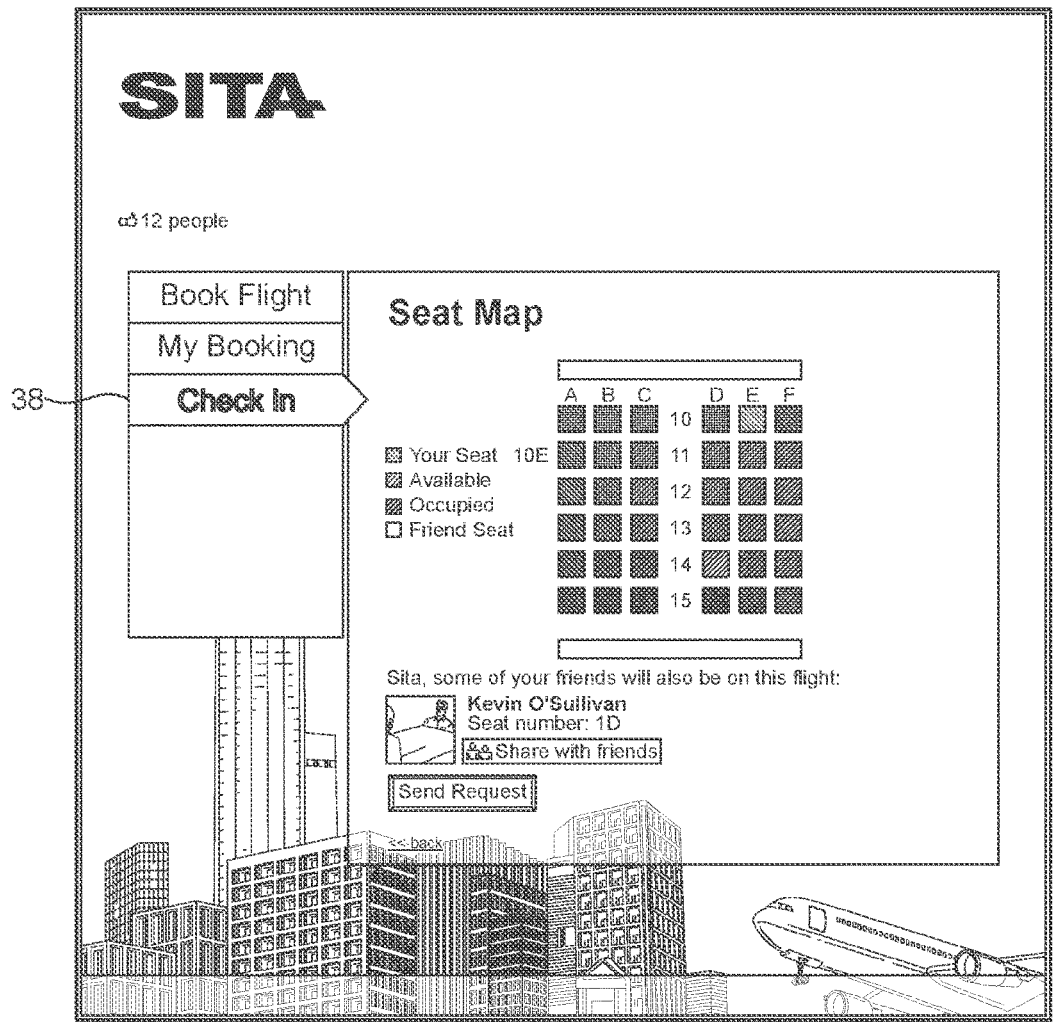
FIG. 4 is a screen shot presented to the user during the check-in process.

The description above was concerned with the booking or reservation process. FIGS. 3 and 4 illustrate a further embodiment which is concerned with the check-in process for a flight or other means of travel. It is also applicable to other types of reservation which require check-in for examples hotels and other types of accommodation. It was mentioned above that embodiments of the invention are broadly applicable to a variety of types of travel reservation and to event and accommodation reservation. It will be appreciated that some of the environments in which the system of FIGS. 1 and 2 can be used do not require the user to check-in, for example, where the reservation is for a numbered seat in a venue. In that case, the method and system of FIGS. 1 and 2 may be used in isolation.

In FIG. 3 the elements of the system shown are the same as those of FIG. 1 and carry the same reference numeral. The reservation system 12 is replaced by a Departure Control System 50 which interacts with individual airlines in a known manner. In practice, the reservation system and the departure control system may be resident on the same mainframe computer and will communicate with one another at a number of levels.

A user will check-in after they have already made a reservation. Their social networking ID may already be stored in a check-in database 36 with other details of the flight for which they are checking in. This check-in database may be the same as, or in communication with, the booking database 14 of FIG. 1 and the check-in process may comprise setting one or more flags against the reservation to show that the user has checked-in. If the user did not provide a social networking ID on reservation the user's social networking ID may be retrieved automatically as the user is logged into the social networking site and the ID is therefore known. As in the previous example, the ID can be captured from multiple sources when checking-in including call centre check-in, mobile check-in and kiosk check-in.

When a subsequent user checks-in for a flight, multiple searches are made. First, the Booking Engine initiates the check-in process on the airline reservation system and returns data to the client, for example in a web browser, showing the available seats for selection.

In parallel, the client browser initiates an asynchronous enquiry 40 to the booking engine. As with the previous embodiment, the client browser sends the list of the social networking identifications of their friends' or contacts' lists which is retrieved from the social networking website to the booking engine together with flight data such as fight number and departure date. The booking engine 10 then searches at 42 for other bookings already stored and looks for IDs from that list which have already checked into the flight onto which the user is checking in so comparing IDs and flight data. The details of that user, together with their seat number are returned to the user's browser and displayed on a flight information screen alongside the check-in options.

The flight information display is shown in FIG. 4. Here the user has selected the check-in tab 38 which gives details of the flight in the form of a seat map. The details of the friend who has already checked in is displayed, as their user name and icon, to inform the user that one or more of their friends has already checked into the flight giving their seat number. Although not shown in the figure, the friend's seat allocation is also shown on the display.

This information may be displayed in other ways, for example the seat number may be omitted or the system may ask the user whether they want to sit next to their friend.

The system may also return details of friends who are booked on the flight, but have not yet checked in. In that case, the display will indicate that they are scheduled to travel on the flight but have not yet booked in.

The reservation and check-in processes have been described as separate processes. However, some airlines allow check-in to take place at the time of ticket reservation and booking. The embodiment of FIGS. 3 and 4 could therefore take place at the same time as the embodiment of FIGS. 1 and 2.

Where the reservation is for accommodation, for example in a hotel, the system may display the ID of the friend or contact who is also staying in the hotel. Where that friend or contact has already check-in, the room number may also be displayed.

Embodiments of the invention have the advantage that they utilise features of social networking platforms such as web sites that are common to all such platforms to enhance the booking and/or check-in process so that the user becomes aware of friends or contacts who are booked onto the same flight or checked in onto the same flight, who are travelling to the same destination over an overlapping period, or who are resident in the destination to which the user is travelling.

Many modifications may be made to the embodiments described without departing from the scope of the invention. For example, in the embodiment of FIGS. 1 and 2, the system may return details of friends who are either visiting the destination at the same time as the user, in that their destination and times overlap as described, or will be travelling on the same flight that the user is searching. Both options may be provided. Thus, a user may be presented with several alternative flights together with details of one or more of their friends on any of those flights.

In the embodiment above, the social networking website is interrogated to retrieve the user's friends or contacts list at the time of booking or checking-in. In an alternative embodiment this step is performed when the user first registers or uses the system, that is when they first enter their own social networking ID into the system or an associated system from which it can be retrieved. This has the advantage that the booking system does not need to interrogate the social networking website at the time of reservation or check-in which may make the process faster. However it does have the disadvantage that the friends or contact list, which can be stored at the booking or check-in database may become out-of-date. This problem could be overcome by regular update enquiries to the social networking platform.

As well as identifying friends or contacts at check-in who have already checked-in or who are due to check-in, the system may, at this point, identify parties who will be at the same destination at the same time or who are listed as resident in that destination as described with respect to the reservation process of FIGS. 1 and 2.

The invention claimed is:

1. A computerized on-line reservation method, comprising the steps of:

receiving a reservation enquiry at a computerized booking system from a user;

receiving the user's social networking identification on a social networking platform at the computerized booking system;

storing the social networking identification of the user in a database associated with the computerized booking system;

in response to a subsequent user submitting a reservation enquiry;

retrieving a list of social networking identifications (SNIDs) for that user from the social networking platform, the list comprising a group of one or more other parties registered on the social networking platform with whom the subsequent user is associated;

searching, at the computerized booking system, for third party reservations having at least one overlapping reservation criterion and an associated SNID from the subsequent user's list;

sending a request to the social networking platform to retrieve a city of residence of each party in the subsequent user's list of associated parties;

comparing the residences of the list of associated parties with a chosen destination of the subsequent user;

displaying to the subsequent user, an identification of any party from the list recorded by the social networking platform as resident in the subsequent user's destination city; and displaying to the subsequent user the SNID of a third party identified by the search together with information regarding the reservation.

2. A method according to claim 1, wherein the overlapping criterion comprises destination and date.

3. A method according to claim 1, wherein the reservation system is a travel reservation system and the overlapping criterion comprises the instance of travel being reserved by the subsequent user.

4. A method according to claim 3, wherein the instance of travel is one of a flight, rail journey, road journey or water journey.

5. A method according to claim 1, wherein the user's SNID is received from the user as part of the reservation request.

6. A method according to claim 1, wherein the step of receiving the user's SNID comprises retrieving the SNID from the database associated with the booking system.

7. A method according to claim 1, wherein the user's SNID is received from an associated booking system.

8. A method according to claim 1, wherein: a) the overlapping criterion comprises a destination; and b) displaying to the subsequent user the SNIDs of parties with whom the subsequent user is associated and who have travelled to the destination in the past.

9. A computerized method according to claim 1, wherein the platform is a web site.

10. A computerized on-line reservation method comprising the steps of:
receiving a reservation enquiry at a computerized booking system from a user;
receiving the user's identification on a social networking platform at the computerized booking system;
storing the social networking identification of the user in a database associated with the computerized booking system;
in response to a subsequent user submitting a reservation enquiry;
retrieving a list of social networking identifications (SNIDs) for that user from the social networking platform, the list comprising a group of one or more other parties registered on the social networking platform with whom the subsequent user is associated;
searching, at the computerized booking system, for third party reservations having at least one overlapping reservation criterion and an associated SNID from the subsequent user's list;
displaying to the subsequent user the SNID of a third party identified by the search together with information regarding the reservation;
on receipt of a check-in request message received at the booking engine from a user's browser, retrieving the SNIDs of the user's list of associated parties on the social networking platform and comparing the SNIDs of the associated parties' with other passengers checked in or scheduled to check-in to the same journey as said user; and
on finding a matching SNID, displaying the matching ID to the user.

11. A method according to claim 10, wherein the reservation is a seat reservation and the third party's SNID is displayed together with the seat to which that ID has been allocated where the third party has checked in.

12. A method according to claim 10, wherein the reservation is a room accommodation and the third party's SNID is displayed together with the room to which that ID has been allocated if the third party has checked in.

13. A computerized method according to claim 10, wherein the social network platform is a web site.

14. A method according to claim 10, wherein the user's SNID is received from the user as part of the reservation request.

15. A method according to claim 10, wherein the step of receiving the user's SNID comprises retrieving the SNID from the database associated with the booking system.

16. A method according to claim 10, wherein the user's SNID is received from an associated booking system.

17. A computerized on-line check-in method for check-in to a previously made reservation for travel, comprising the steps of:
receiving a check-in request at a computerized booking system from a user computer via a browser;
receiving the user's identification on a social networking platform at the computerized booking system;
retrieving a list of social networking identifications (SNIDs) for that user from the social networking platform, the list comprising a group of one or more other parties registered on the social networking platform with whom the subsequent user is associated;
searching, at the computerized booking system, for third party reservations for travel having at least one overlapping criterion and an associated SNID from the subsequent user's list;
displaying to the user in the user's browser the SNID of a third party identified by the search as making the same journey together with information regarding the reservation; and
wherein the booking system determines whether a third party identified by the search has checked-in and, if it has, displays the seat number of the third party in the user's browser.

18. A computerized on-line check-in method according to claim 17, wherein the platform is a website.

19. A computerized on-line check-in method for check-in to a previously made reservation for accommodation, comprising the steps of:
receiving a check-in request at a computerized booking system from a user computer via a browser;
receiving the user's identification on a social networking platform at the computerized booking system;
retrieving a list of social networking identifications (SNIDs) for that user from the social networking platform, the list comprising a group of one or more other parties registered on the social networking platform with whom the subsequent user is associated;
searching, at the computerized booking system, for third party reservations for accommodation having at least one overlapping criterion and an associated SNID from the subsequent user's list;
displaying to the user in the user's browser the SNID of a third party identified by the search as having booked the accommodation for an overlapping period together with information regarding the reservation; and
wherein the booking system determines whether a third party identified by the search has checked-in, and if it has, displays the room number of the third party in the user's browser.

20. A computerized on-line check-in method according to claim 19, wherein the platform is a website.

\* \* \* \* \*